Oct. 11, 1955   H. T. YOUNGREN ET AL   2,720,298
CLUTCH WITH SPRING WASHER LEVER
Original Filed Feb. 2, 1949
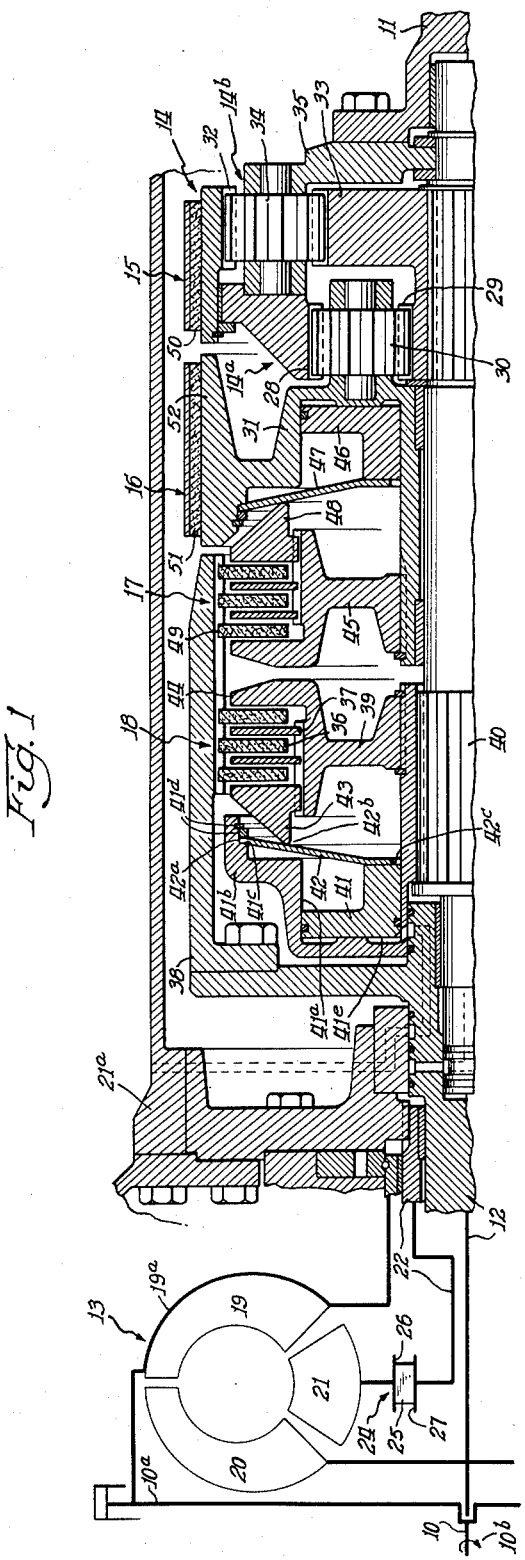
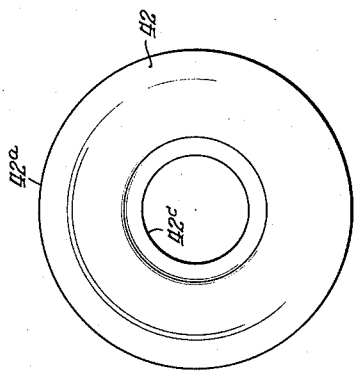
Inventors:
Harold T. Youngren,
Herdis George English and
Sidney V. Hettinger, Jr.
By: Keith J. Bleuer
Atty.

United States Patent Office 2,720,298
Patented Oct. 11, 1955

2,720,298

CLUTCH WITH SPRING WASHER LEVER

Harold T. Youngren, Birmingham, Mich., and Herdis George English, La Grange, and Sidney V. Hettinger, Jr., Westchester, Ill., assignors to Borg-Warner Corporation, Chicago, Ill., a corporation of Illinois Original application February 2, 1949, Serial No. 74,098. Divided and this application April 20, 1950, Serial No. 164,458

6 Claims. (Cl. 192—99)

Our invention relates to clutches and more particularly to control mechanism for clutches.

It is an object of the invention to provide an improved clutch construction and more particularly a friction clutch applying linkage which includes a strut for applying a multiplied force on a clutch pressure plate as compared with the force applied to a fluid pressure operated clutch engaging piston acting on the strut. More particularly it is an object with such arrangement to utilize a pressure plate of greater diameter than the piston so that there is less centrifugal force on any residual fluid remaining in the cylinder for the piston than would be the case if the piston were of the same diameter as the pressure plate. It is another object in this connection to utilize a strut which is of spring material and is anchored at some point thereof which in itself provides the appropriate force for returning the piston to its clutch disengaging position. More specifically it is an object to utilize a spring washer, known more particularly as a "Belleville" washer, for functioning as the strut which washer is acted on by the piston at its inner periphery and is distorted when the piston is moved in a clutch applying direction so as to exert a spring force tending to move the piston back to its clutch disengaging position.

The invention consists of the novel clutch control mechanism to be hereinafter described and claimed for carrying out the above-stated objects and such other objects as will appear from the following description of a preferred embodiment of the invention, illustrated with reference to the accompanying drawing, wherein:

Fig. 1 is a partly schematic longitudinal sectional view of a transmission embodying the novel clutch control mechanism of the invention; and Fig. 2 is a side view on a reduced scale of the Belleville washer.

This application constitutes a division of our copending application Serial No. 74,098 filed February 2, 1949, for Transmission.

Like characters of reference designate like parts in the several views.

Referring now to Fig. 1, the illustrated transmission comprises a drive shaft 10, a driven shaft 11 and an intermediate shaft 12. The drive shaft 10 is adapted to be connected to the engine (not shown) of the vehicle in which the transmission is installed, and the driven shaft 11 is adapted to be connected by any suitable mechanism with the driving road wheels (not shown) of the vehicle. The transmission comprises, in general, a hydraulic torque converter 13, a planetary gear set 14 and friction brakes 15 and 16 and friction clutches 17 and 18 for controlling the planetary gear set.

The hydraulic torque converter 13 is of an ordinary construction and comprises a bladed impeller 19 connected to be driven by the drive shaft 10, a bladed rotor 20 fixed to the intermediate shaft 12 and a bladed stator 21 disposed on a shaft 22 fixed with respect to the casing 21a of the transmission. The blades of all three of the elements 19, 20 and 21 are within a fluid casing which is formed by the shell 19a of the impeller and by the flywheel 10a driven by the drive shaft 10. A one-way roller clutch 24 is disposed between the stationary shaft 22 and the stator 21 for preventing the stator 21 from rotating in the reverse direction, that is, in a direction reverse to the direction in which the drive shaft 10 is driven which is indicated by the arrow 10b. The one-way clutch 24 comprises rollers 25 disposed between an outer cylindrical surface 26 and cams 27 formed on the shaft 22. The rollers 25 function to wedge between the cylindrical surface 26 and the cams 27 when the stator tends to rotate in the reverse direction. The roller clutch 24 is of an ordinary construction and hence will not be described further in detail.

The hydraulic torque converter 13 is of an ordinary construction, and further detail is not believed necessary in connection with this unit. In general, however, the torque converter 13 functions to drive the shaft 12 at an increased torque with respect to the torque applied to the shaft 10. The shaft 12 constitutes a driven shaft with respect to the torque converter 13, and as will hereinafter appear, the shaft 12 constitutes a drive shaft with respect to the planetary gear set 14. In accordance with the well-known principles of operation of such torque converters, when the impeller 19 of the torque converter is driven by the drive shaft 10, the fluid within the casing of the torque converter is driven in a toroidal direction of flow, and the fluid impinges on the blades of the rotor 20 and impresses a torque on the rotor and causes it to rotate. The torque impressed on the rotor is higher than that on the drive shaft 10 due to the function of the blades in the stator 21 which change the direction of flow of the fluid. Under these circumstances the reaction of the fluid on the stator is in the reverse direction, tending to rotate the stator in this direction. On the speed of the rotor 20 reaching a predetermined value, the fluid changes its direction of flow and thereafter tends to rotate the stator 21 in the forward direction, that is, in the same direction the shaft 10 is rotated. At this time, the one-way clutch 24 releases, and the stator rotates forwardly freely. The torque converter 13 thereupon functions as a simple fluid coupling so that only the torque impressed on the drive shaft 10 is impressed on the rotor 20.

The planetary gear set 14 is connected in tandem with the torque converter 13, being disposed between the shaft 12 and the shaft 11, with the shaft 12 constituting its drive shaft and the shaft 11 constituting its driven shaft. The planetary gear set 14 comprises in reality two planetary units 14a and 14b. The planetary unit 14a comprises a ring gear 28, a sun gear 29, planet gears 30 in mesh with the sun and ring gears, and a planet gear carrier 31. The planetary gear unit 14b comprises a ring gear 32, a sun gear 33, planet gears 34 in mesh with the sun and ring gears, and a planet gear carrier 35. As will be noted from the drawing, the sun gears 29 and 33 are formed integrally with each other, and the ring gear 28 and planet gear carrier 35 are connected with the driven shaft 11. The ring gear 32 is journaled on the ring gear 28, as shown.

The friction clutch 18 is provided for connecting the sun gears 29 and 33 with the intermediate shaft 12. The clutch 18 comprises clutch discs 36 and 37. The clutch discs 36 are splined on to a shell 38 which is fixed with respect to the shaft 12, and the discs 37 are splined on to a hub member 39 which in turn is splined on to a shaft 40 piloted in the shafts 12 and 11. The sun gears 29 and 33 are splined on to the shaft 40, as shown.

A piston 41 adapted to be actuated by fluid pressure applied to it is provided for engaging the clutch 18. The piston is annular in shape and is slidably disposed in a similarly shaped cavity 41a in a member 41b splined to the shaft 40. Fluid pressure is supplied to the cavity 41a by any suitable conduits. The piston acts through a "Belleville" type spring washer 42, which functions as a strut, on a pressure plate 43 on one side of the discs 36 and 37, and a backing plate portion 44 is provided on the other side of the discs 36 and 37 as shown. The washer 42 is annular in shape and has a dished cross-section, as shown. The washer is shown as being solid; however, it may be slotted in any suitable manner as desired in order to give it more resiliency. The washer 42 is pivotally fixed at its outer periphery 42a within the member 41b by any suitable means such as a shoulder 41c formed in the member 41b and washers 41d. It will be noted that the washer 42 contacts the pressure plate 43 at an intermediate point 42b on the washer, and the piston 41 contacts the washer 42 at its inner periphery 42c.

When the piston 41 is moved to the right as seen in Fig. 1, as by the application of fluid pressure within the cavity 41a to the inside face 41e of the piston, it rotates the inner periphery 42c of the washer 42 about its pivotal anchorage at its outer periphery 42a and moves the pressure plate 43 to the right as seen in the figure to compress the discs 36 and 37 between the pressure plate portions 44 and 43 for engaging the clutch 18. In accordance with well-known principles concerning "Belleville" type spring washers, such movement of the inner periphery 42c of the washer 42 is against the spring action of the washer, and when fluid pressure is released from behind the piston 41, the spring action of the washer 42 moves the piston back into its illustrated clutch disengaged position. Since it is the inner periphery of the washer 42 that is moved by the piston 41 while the outer periphery of the washer is fixed, the pressure plate 43 moves through a smaller distance than does the piston 41, and the force exerted on the piston 43 is multiplied due to the strut action of the washer 42 as compared with the total fluid force on the piston 41. Thus a smaller piston 41 is required for a certain clutch engaging force than would be necessary if the clutch were directly connected to move the pressure plate 43.

A further noteworthy feature of the "Belleville" type washer arrangement for connecting the piston 41 and the pressure plate 43 lies in the fact that the piston is relatively small in diameter and is located quite close to the center of the shafts 10, 40 and 11 as compared with the distance the pressure plate 43 and the discs 36 and 37 are located from the center. It is desirable to have large diameter clutch discs 36 and 37 for providing a large clutch capacity and as will be explained, it is desirable to have a small diameter clutch operating piston 41. As is well known in connection with such clutch pistons, there is generally residual fluid remaining behind the piston after the application of fluid pressure to the piston has ceased. This fluid rotates with the piston and a centrifugal force develops in the fluid tending to move the piston outwardly in a clutch engaging direction. The closer the piston is to the center of rotation, the less is such centrifugal force and the smaller the spring means that is required for holding the clutch in disengaged position, and hence the smaller the size of piston that may be used for engaging the clutch.

The clutch 17 comprises clutch discs 36 and 37 similar to those in the clutch 18, with the discs 36 for the clutch 17 being splined to the shell 38 and the discs 37 in the clutch 17 being splined to a hub 45. The hub 45 is fixed to the carrier 31 as shown, and the carrier has a piston 46 disposed therein which is utilized for engaging the clutch 17. The piston 46 acts by means of a "Belleville" type washer 47 on a pressure plate 48 on one side of the discs 36 and 37 in this clutch, and the hub 45 is provided with a backing plate portion 49 on the other side of these discs 36 and 37. The clutch 17 is engaged by means of the piston 46 acting to compress the discs 36 and 37 between the pressure plate 48 and the pressure plate portion 49, and the "Belleville" type washer 47 functions in the same manner and for the same purposes as the washer 42 to provide a multiplied clutch engaging pressure, to retract the clutch and to allow the use of a smaller size and diameter of piston.

The friction brake 15 comprises a friction band 50 which acts on the ring gear 32, and the friction brake 16 comprises a friction band 51 acting on a drum portion 52 provided on the planet gear carrier 31. The bands 50 and 51 may be engaged by any suitable means such as fluid pressure motors (not shown), for example.

The illustrated transmission provides three speeds in forward drive and a drive in reverse. The torque converter 13 is in each of these drives and carries the entire torque impressed on the drive shaft 10 of the transmission. Since the torque converter provides torque multiplication in itself, for ordinary driving the intermediate and high speed forward drives are generally sufficient, and the low speed drive is necessary only in case of emergencies or for descending hills with the vehicle. Intermediate speed forward drive is obtained by engaging the brake 14 for the ring gear 32 and engaging the clutch 17. In this case, the carrier 31 is driven by the torque converter 13, and the ring gear 32 functions as the reaction gear of the planetary gear set 14. The direct forward drive is obtained by engaging the clutch 18 and disengaging the brake 15, allowing the clutch 17 to remain engaged. The sun gears 29 and 33, as well as the planet gear carrier 31, in this case are connected with the intermediate shaft 12, and the elements of the planetary gear set 14 are locked together to rotate as a unit to drive the shaft 11 at the same speed as the shaft 12.

A reverse drive is obtained by engaging the friction brake 16 and the clutch 18. In this case, the ring gear 28 is driven through the planetary gear unit 14a in the reverse direction, and since it is coupled directly with the driven shaft 11 through the planet gear carrier 35, the shaft 11 is also driven in this direction.

A low speed forward drive for use in emergencies is obtained by engaging the brake 15 and the clutch 18. In this case the rear planetary gear unit 14b functions to drive its carrier 35 and thereby the driven shaft 11 of the transmission in the low speed forward drive.

It will be noted that the brakes 15, 16 and the clutches 17 and 18 are all of the friction type, and this being so, the planetary gear set 14 may be shifted between its various speed ratios by power shifting, that is, by engagement of friction engaging elements with torque being transmitted without interruption to the drive shaft 10 of the transmission.

The arrangement of the relatively large diameter clutch engaging pressure plates 43 and 48, the relatively small diameter pistons 41 and 46 and the "Belleville" washers 42 and 47 connecting the pistons and pressure plates permit the use of relatively small area pistons due to the multiplication of effort, and the small pistons permit the use of smaller piston return springs since any residual fluid remaining in the cylinders for the pistons exerts a smaller centrifugal force tending to move the pistons to clutch engaging positions than would be the case with larger pistons. The "Belleville" spring washers advantageously function in themselves to provide the spring force for returning the fluid operated pistons to their clutch disengaging positions when the fluid pressure to the pistons is disapplied.

We wish it to be understood that the invention is not to be limited to the specific clutch control mechanism shown and described, except only insofar as the claims may be so limited, as it will be apparent to those skilled in the art that changes may be made without departing from the principles of the invention.

We claim:

1. In a clutch construction, the combination of a clutch pressure plate having clutch-engaging and disengaging positions, a fluid pressure operated piston, said pressure plate and piston having a common center of rotation and the pressure plate being located at a greater distance from said center of rotation than said piston, and a resilient lever having spaced first and second portions respectively engaging said piston and said pressure plate; means for anchoring a third portion of said lever, said lever being operated on by the piston for moving the pressure plate in a clutch applying direction with a force greater than that applied to the piston and for moving the piston in a clutch disapplying direction when the fluid pressure force is released from the piston, actuation of said piston flexing said lever to induce a reactionary force in said lever tending to move said piston in a clutch disapplying direction when said plate is in its clutch engaging position.

2. In a clutch construction, the combination of friction discs adapted to be engaged with each other, a pressure plate effective for engaging said discs, a fluid pressure operated piston, a resilient lever for applying a force from said piston to said pressure plate and for moving the piston in a clutch disapplying direction when the fluid pressure force is released from the piston, said pressure plate and piston having a common center of rotation and the pressure plate being located at a greater distance from said center of rotation than the piston, and means for anchoring said lever at its outer end, said lever being acted on by said piston at its inner end and being effective on said pressure plate at a point intermediate its ends, actuation of said piston flexing said lever to induce a reactionary force in said lever tending to move said piston in a clutch disapplying direction when said plate is in its discs-engaging position.

3. In a clutch construction, the combination of a movable clutch pressure plate having clutch engaging and disengaging positions, a fluid pressure operated piston, said pressure plate and piston having a common center of rotation and the pressure plate being at a greater distance from said center than said piston, and a spring washer anchored at a point thereof and rotatable about said point and engaging said piston and pressure plate to be effective as a strut to transfer force from said piston to said pressure plate with the force on the plate being greater than that applied to the piston, said spring washer being distortable when the piston is moved in a clutch engaging direction whereby to move said piston back to its clutch disengaging position when the fluid pressure force on the piston is released.

4. In a clutch construction, the combination of a movable clutch engaging member having clutch engaging and disengaging positions; a clutch operating member movable in clutch applying and disapplying directions for actuating said engaging member to its clutch engaging and disengaging positions; a Belleville type spring washer connecting said members and actuatable by said operating member, during its movement in one of said directions, for moving the engaging member to one of said positions; anchoring means for preventing axial movement of the outer peripheral portion of said washer, actuation of said washer by said operating member flexing said washer to induce a reactionary force in said washer tending to move said operating member in the other of said directions when said engaging member is in said one position.

5. In a clutch construction, the combination of a resilient lever in the form of an annular Belleville spring washer having unbroken inner and outer peripheral portions and being of normally dished configuration with the inner peripheral portion of the washer lying in a plane spaced from a plane containing the outer peripheral portion, anchoring means preventing axial movement of one of the peripheral portions of said washer, a movable clutch engaging member abutting said washer between said peripheral portions, and a clutch operating member in the form of a fluid pressure-operated piston abutting said washer at the other of its peripheral portions, said operating member being movable in clutch applying and disapplying directions for actuating said engaging member to clutch engaging and disengaging positions through the medium of said washer, actuation of said washer by movement of said operating member in one of said directions flexing said washer to induce a reactionary force in the washer tending to move the operating member in the other of said directions upon the release of the clutch applying force on the clutch operating member.

6. In a clutch construction, the combination of a solid annular spring washer of normally dished configuration with the inner peripheral portion of the washer lying in a plane spaced from a plane containing the outer peripheral portion, anchoring means preventing axial movement of the outer peripheral portion of said washer, an annular movable clutch pressure plate abutting said washer between said peripheral portions, and an annular fluid pressure actuated piston abutting said washer at its inner peripheral portion, said piston being movable in clutch applying and disapplying directions for actuating said pressure plate to clutch engaging and disengaging positions through the medium of said washer, actuation of said piston moving said pressure plate to its clutch engaging position and flexing said washer to induce a reactionary force in the washer to move said piston to its clutch disapplying position upon the release of the fluid pressure force from the piston.

References Cited in the file of this patent

UNITED STATES PATENTS

| | | |
|---|---|---|
| 1,571,015 | Leighton | Jan. 26, 1926 |
| 2,023,597 | Klocke et al. | Dec. 10, 1935 |
| 2,176,468 | Morin et al. | Oct. 17, 1939 |
| 2,211,191 | Wolfram | Aug. 13, 1940 |
| 2,244,169 | Miller | June 3, 1941 |
| 2,275,204 | Smirl | Mar. 3, 1942 |
| 2,290,513 | Wemp | July 21, 1942 |
| 2,380,677 | Schjolin | July 31, 1945 |
| 2,396,153 | Butler | Mar. 5, 1946 |
| 2,399,886 | Odevseff | May 7, 1946 |
| 2,422,155 | Wemp | June 10, 1947 |
| 2,589,291 | Sanford | Mar. 18, 1952 |

FOREIGN PATENTS

| | | |
|---|---|---|
| 829,074 | France | June 10, 1938 |